United States Patent
Grevers et al.

(10) Patent No.: US 12,493,294 B2
(45) Date of Patent: Dec. 9, 2025

(54) MANAGING OBJECT ROUTING IN COMPUTING ENVIRONMENTS

(71) Applicant: Dell Products L.P., Round Rock, TX (US)

(72) Inventors: Theodore R Grevers, Milford, MA (US); Joseph Siebold, Bentonville, AR (US)

(73) Assignee: Dell Products L.P., Round Rock, TX (US)

( * ) Notice: Subject to any disclaimer, the term of this patent is extended or adjusted under 35 U.S.C. 154(b) by 269 days.

(21) Appl. No.: 18/110,453

(22) Filed: Feb. 16, 2023

(65) Prior Publication Data
US 2024/0280990 A1  Aug. 22, 2024

(51) Int. Cl.
*G05D 1/00* (2024.01)
*G05B 19/418* (2006.01)

(52) U.S. Cl.
CPC ..... *G05D 1/0223* (2013.01); *G05B 19/41895* (2013.01); *G05D 1/0088* (2013.01)

(58) Field of Classification Search
CPC ............ G05D 1/0223; G05D 1/0088; G05D 2109/14; G05D 1/225; G05D 1/646; G05D 1/693; G05D 1/6987; G05D 2105/28; G05D 2107/70; G05B 19/41895
See application file for complete search history.

(56) References Cited

U.S. PATENT DOCUMENTS

| | | | |
|---|---|---|---|
| 2010/0082194 A1* | 4/2010 | Yabushita | G05D 1/02 701/25 |
| 2016/0232150 A1* | 8/2016 | Decraene | G06F 17/245 |
| 2019/0152057 A1* | 5/2019 | Sharp | B25J 9/1664 |

(Continued)

FOREIGN PATENT DOCUMENTS

| | | | | |
|---|---|---|---|---|
| CN | 110264120 A | * | 9/2019 | ............. G06N 3/00 |
| JP | 2022035999 A | * | 3/2022 | ............. G05D 1/02 |

OTHER PUBLICATIONS

Mengya Liu, Kim Leng Poh, "E-commerce warehousing: An efficient scattered storage assignment algorithm with bulky locations", Computers & Industrial Engineering, vol. 181, 2023, https://doi.org/10.1016/j.cie.2023.109236 (Year: 2023).*

Z. Zhang, Q. Guo, J. Chen and P. Yuan, "Collision-Free Route Planning for Multiple AGVs in an Automated Warehouse Based on Collision Classification," in IEEE Access, vol. 6, pp. 26022-26035, 2018, doi: 10.1109/ACCESS.2018.2819199 (Year: 2018).*

(Continued)

*Primary Examiner* — Ramya P Burgess
*Assistant Examiner* — Brittany Renee Peko
(74) *Attorney, Agent, or Firm* — Ryan, Mason & Lewis, LLP

(57) ABSTRACT

Techniques are provided to manage routing of mobile objects in a given environment. For example, a method is performed by an object routing system. The object routing system receives a request for a given mobile object to traverse from a first location to a second location in a physical environment which is logically partitioned into a plurality of grid locations. The object routing system computes a route for the given mobile object to traverse from the first location to the second location. The computed route comprises a sequence of grid locations which are reserved at corresponding times, wherein each grid location of the computed route is reserved for the corresponding time that the given mobile object is expected to traverse through the grid location. The object routing system commands the given mobile object to traverse the computed route.

20 Claims, 5 Drawing Sheets

(56) References Cited

U.S. PATENT DOCUMENTS

2019/0361464 A1\* 11/2019 Ahnell ................. G05D 1/0289
2020/0012268 A1\*  1/2020 Stadie .............. G05B 19/41895
2021/0078175 A1\*  3/2021 Liu ........................ B25J 9/1666
2022/0388772 A1\* 12/2022 Hatteland ............ B65G 1/0464
2023/0195119 A1\*  6/2023 Horowitz ............. G05D 1/0212
2024/0182066 A1\*  6/2024 Yamashita .......... B60W 60/001

OTHER PUBLICATIONS

Wikipedia, "Automated Guided Vehicle," https://en.wikipedia.org/w/index.php?title=Automated_guided_vehicle&oldid=1127996945, downloaded Feb. 16, 2023, 13 pages.

\* cited by examiner

MANAGING OBJECT ROUTING IN COMPUTING ENVIRONMENTS

TECHNICAL FIELD

This disclosure relates generally to techniques for managing routing of mobile objects in a warehouse logistics computing environment or other type of computing environment, as well as in numerous other environments.

BACKGROUND

Currently, many warehouse facilities utilize human operated forklifts to retrieve or place inventory on shelves. Certain warehouse facilities have narrow aisleways such that only operator at a time can access a given aisle and where human operated forklifts enter from one end of the facility. This model is inefficient, as only one forklift can access an aisle at any one time. If the destinations of the forklifts and inventory are known in advance, then multiple forklifts could operate in the same aisle, knowing that they do not have overlapping routes to their destinations. Other warehouse facilities utilize mobile inventory racks, which are automated guided vehicles (AGVs) with shelves built thereon, to move inventory. The mobile inventory racks utilize predefined routes to move inventory and must frequently stop and go along routes to their destination to prevent collision with other mobile inventory racks moving along cross traffic routes.

SUMMARY

Exemplary embodiments of the disclosure include techniques for managing routing of mobile objects. For example, in an exemplary embodiment, a method is performed by an object routing system. The object routing system receives a request for a given mobile object to traverse from a first location to a second location in a physical environment which is logically partitioned into a plurality of grid locations. The object routing system computes a route for the given mobile object to traverse from the first location to the second location. The computed route comprises a sequence of grid locations which are reserved at corresponding times, wherein each grid location of the computed route is reserved for the corresponding time that the given mobile object is expected to traverse through the grid location. The object routing system commands the given mobile object to traverse the computed route.

Other embodiments will be described in the following detailed description of exemplary embodiments, which is to be read in conjunction with the accompanying figures.

DETAILED DESCRIPTION

Exemplary embodiments of the disclosure will now be described in further detail with regard to computing environments (e.g., edge computing environment) which implement systems and methods for managing routing of mobile objects (such as automated guided vehicles) in physical environments (e.g., a warehouse facility) for application platforms (e.g., logistics management) deployed in the computing environments. For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

Figure 1:
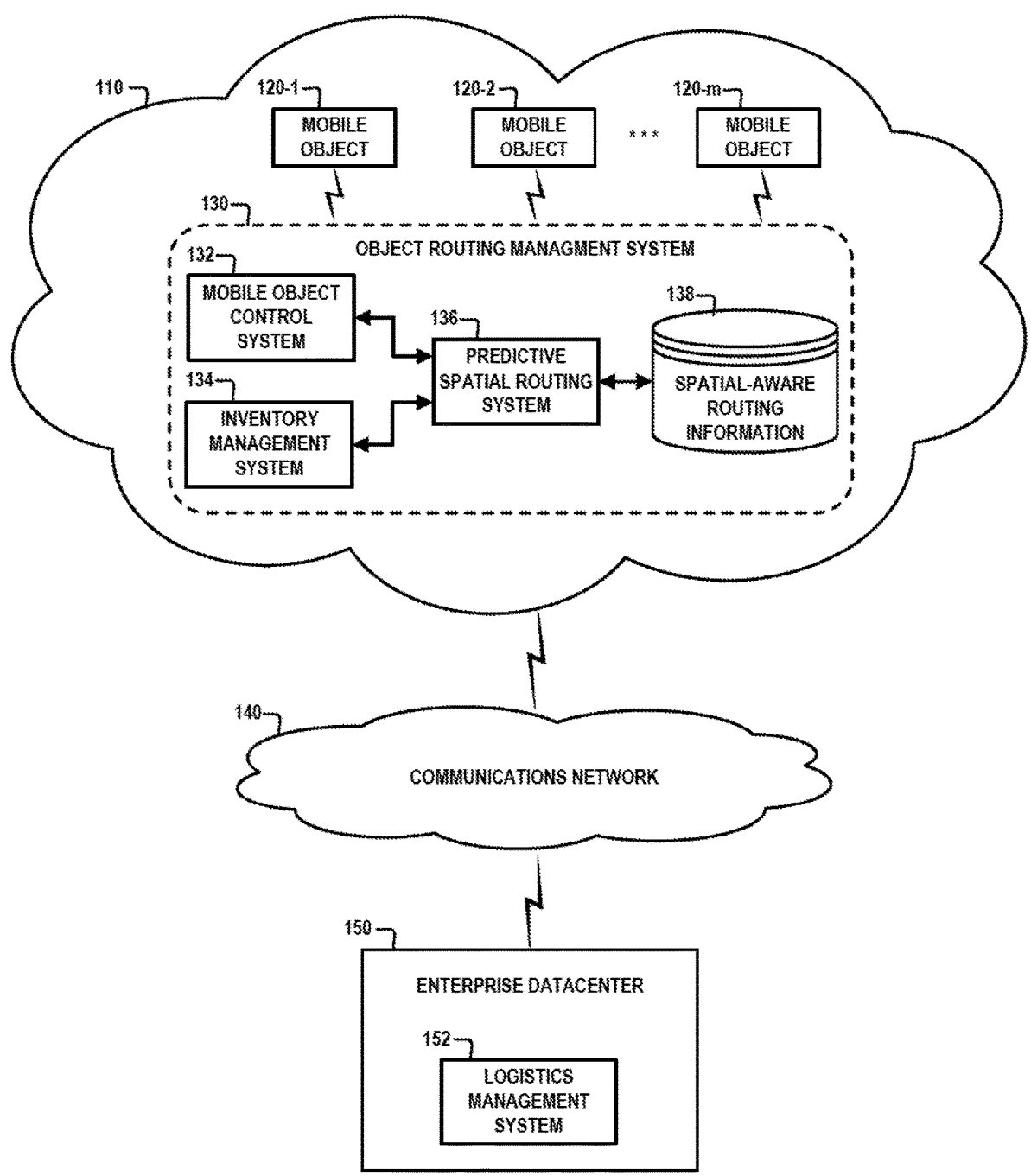
FIG. 1 schematically illustrates a network computing environment which comprises an object routing management system, according to an exemplary embodiment of the disclosure.

FIG. 1 schematically illustrates a network computing environment which comprises an intelligent object routing management system, according to an exemplary embodiment of the disclosure. In particular, FIG. 1 schematically illustrates a network computing environment 100 which comprises an edge computing environment 110 comprising a plurality of mobile objects 120-1, 120-2, . . . , 120-m (collectively, mobile objects 120), and an object routing management system 130 (or object routing system 130). The object routing management system 130 comprises a mobile object control system 132, an inventory management system 134, a predictive spatial routing system 136, and a database of spatial-aware routing information 138. The network computing environment 100 further comprises a communications network 140, and an enterprise datacenter 150 which hosts a logistics management system 152.

In some exemplary embodiments, in the context of warehouse logistics, the edge computing environment 110 is implemented in a physical environment such as warehouse building (e.g., retail warehouse, distribution center, inventory storage facility, etc.) which comprises storage racks (e.g., pallet racks, cantilever racks, etc.) to store physical inventory. In such embodiments, the mobile objects 120 comprise mobile apparatus such as AGVs that are utilized to move physical inventory within the warehouse building under control of the object routing management system 130 and the logistics management system 152, using techniques as will be discussed in detail below. An AGV is a mobile/portable robot that is configured to transport inventory (e.g., pallets) within the warehouse building and place/retrieve physical inventory onto/from storage racks at target locations within the warehouse building. The AGVs used in a warehouse facility move inventory loads around the warehouses and prepare such inventory loads for shipping/loading or receiving or moving them from an induction conveyor to storage locations within the warehouse facility.

The AGVs can implement one of various types of navigation systems including, but not limited to, guide tape navigation, wired RF (radio frequency) navigation, laser target navigation, vision (camera) guided navigation, geo-guided navigation, etc. In particular, for guide tape navigation, magnetic guide tape (which is unpowered or passive) is placed on the floor of the warehouse to define target paths along which an AGV can travel. The AGV is fitted with a suitable guide sensor to follow the path of the magnetic tape. For wired navigation, a wire is disposed in a slot that is formed in the warehouse to define a target path along which an AGV can travel. The wire transmits an RF signal, and a sensor which is installed on the bottom of the AGV close to the ground, is utilized to detect a relative position of the RF signal transmitted from the wire. Such information is utilized to control a steering system of the AGV to make the AGV follow the wire.

In some embodiments, the enterprise datacenter 150 is a private (on premises) datacenter that is operated by a given business enterprise, and configured to host the logistics management system 152 to provide centralized management of one or more warehouse facilities of the given business enterprise. In other embodiments, the enterprise datacenter 150 is configured on a public cloud platform (e.g., Amazon Web Services platform). The logistics management system 152 comprises a software platform that is used to control the processes for planning, operating and managing the flow of physical inventory, as well as other operations related to locating, packaging, and shipping orders. In the context of the exemplary embodiments discussed herein, the logistics management system 152 comprises a centralized system that is configured to manage and track physical inventory in multiple warehouse buildings. On the other hand, the various components of the object routing management system 130 in the edge computing environment 110 are configured to control and manage the movement of physical inventory within the physical environment of the warehouse facility using the mobile objects 120, and provide status updates to the logistics management system 152.

The object routing management system 130 and logistics management system 152 communicate over the communications network 140. The communications network 140 comprises one or more types of communications networks such as, a global computer network (e.g., the Internet), a wide area network (WAN), a local area network (LAN), an intranet, a satellite network, a telephone or cable network, a cellular network, a wireless network such as Wi-Fi or WiMAX, or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols.

In some embodiments, the object routing management system 130 comprises a software platform with various software system components that execute a single server node or a cluster of server nodes, depending on the system configuration. In some embodiments, the inventory management system 134 is configured to interface and communicate with the logistics management system 152 over the communications network 140. The inventory management system 134 receives and executes commands from the logistics management system 152 for managing and moving physical inventory within the warehouse building. The mobile object control system 132 is configured to communicate with the mobile objects 120-1, 120-2, . . . , 120-*m* within the edge computing environment 110 to provide commands to the mobile objects 120-1, 120-2, . . . , 120-*m* to retrieve, move, or store physical inventory to and from specified locations (e.g., logically defined locations) in the warehouse environment, wherein the mobile objects 120-1, 120-2, . . . , 120-*m* travel specified routes along predefined paths within the warehouse facility. In addition, the mobile object control system 132 tracks the location of the mobile objects 120-1, 120-2, . . . , 120-*m* as the mobile objects 120-1, 120-2, . . . , 120-*m* travel along the well-defined paths within the warehouse facility.

The predictive spatial routing system 136 is configured to orchestrate and schedule the routes along which the mobile objects 120-1, 120-2, . . . , 120-*m* travel throughout the physical warehouse environment on predefined paths to move inventory items, wherein the routes are determined in a manner that reduces the idle time of the mobile objects 120-1, 120-2, . . . , 120-*m* and improves inventory flow throughout the facility. As explained in further detail below, the predictive spatial routing system 136 implements a time and space coordination process to predict optimal routes for mobile objects 120-1, 120-2, . . . , 120-*m* to traverse to move inventory from one grid location to the next grid location along well-defined paths within the physical environment of the warehouse facility. The exemplary predictive spatial routing techniques discussed herein take into consideration that at any given time, some or all of the mobile objects 120-1, 120-2, . . . , 120-*m* are in motion and travelling along predefined paths from point-to-point in a logical grid coordinate system that is associated with the given physical layout of a given warehouse environment.

As schematically shown in FIG. 1, the predictive spatial routing system 136 interfaces with the mobile object control system 132 and the inventory management system 134. As noted above, the inventory management system 134 manages the movement of physical inventory items within the given warehouse environment. When some physical inventory must be moved from a source location to a destination location, the inventory management system 134 sends requests to the predictive spatial routing system 136 to determine an available mobile object to move the physical inventory from the source location to the destination location (e.g., retrieve stored inventory from a given storage location, or deliver inventory to a target storage location). In response to such request, the predictive spatial routing system 136 accesses the database of spatial-aware routing information 138 to (i) determine a given mobile object which is available and can be assigned to handle the requested task, and (ii) compute a route for the given mobile object to travel to the source location within the warehouse environment to access the inventory.

In some embodiments, the predictive spatial routing system 136 determines a given mobile object among the plurality of mobile objects 120 which is available for use and which is closest to the source location of the physical inventory that is to be accessed and moved, and determines an optimal route for the given mobile object to follow to reach the source location, taking into account the current routes reserved for other mobile objects. Once the given mobile object obtains the physical inventory, the predictive spatial routing system 136 determines an optimal route for the given mobile object to travel from the source location to the destination location within the warehouse environment to deliver the inventory, taking into account the current routes reserved for other mobile objects.

In some embodiments, the database of spatial-aware routing information 138 comprises data structures (e.g., tables) which are configured to organize and record various types of information for computing and reserving routes for the mobile objects 120. For example, such spatial-aware routing information includes unique identifiers (IDs) of the known mobile objects 120-1, 120-2, . . . , 120-m that operate within the edge computing environment 110, the physical locations of the mobile objects 120-1, 120-2, . . . , 120-m over time, the currently assigned routes and destinations assigned to the mobile objects 120-1, 120-2, . . . , 120-m for moving physical inventory, etc. In addition, within a given reserved route assigned to a given mobile object, the dwell time of the given mobile object across each coordinate along the given reserved route is also tracked.

The predictive spatial routing system 136 maintains and periodically updates the database of spatial-aware routing information 138 based on, e.g., real-time location information of the mobile objects 120 which is tracked and provided by the mobile object control system 132. This allows the predictive spatial routing system 136 to orchestrate the continuous movement of the mobile objects 120 between coordinates of determined routes with time and space awareness of the mobile objects 120 while in motion. In some embodiments, to perform the functions associated with predictive spatial routing of objects, the predictive spatial routing system 136 utilizes a logical grid coordinate system which logically represents a physical layout (e.g., X and Y grid coordinates) of the warehouse environment and the predefined paths within the warehouse environment, which can be used to compute routes along which the mobile objects can travel to move physical inventory.

Figure 2:
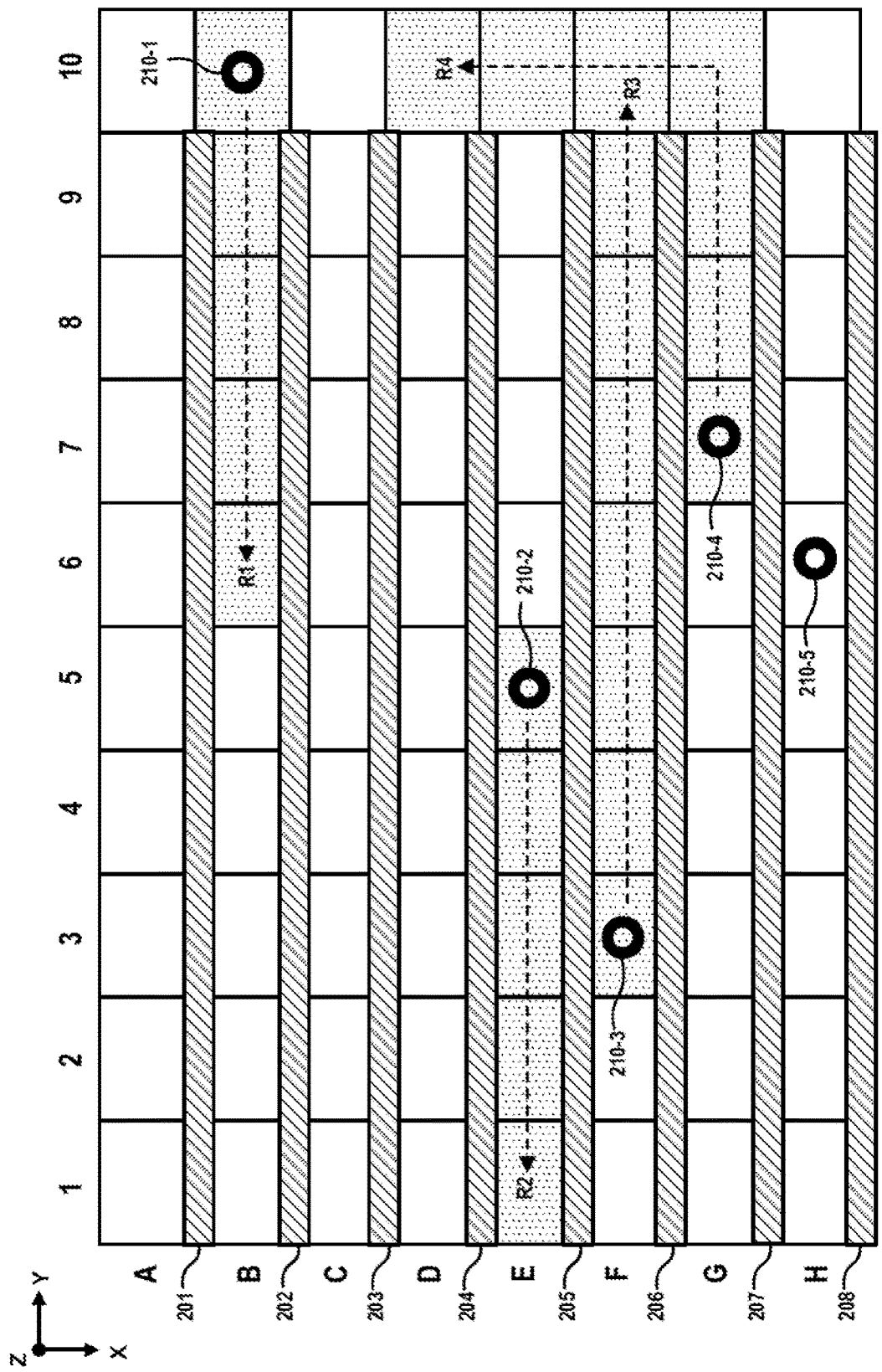
FIG. 2 schematically illustrates a logical grid coordinate system that is utilized for predictive spatial routing of objects, according to an exemplary embodiment of the disclosure.

For example, FIG. 2 schematically illustrates a logical grid coordinate system that is utilized for predictive spatial routing of objects, according to an exemplary embodiment of the disclosure. In particular, FIG. 2 schematically illustrates an exemplary logical grid coordinate system 200 which logically represents a floor plan of a given warehouse environment comprising a plurality of aisles (denoted by letters A, B, C, D, E, F, G, and H) that are separated by shelving 201, 202, 203, 204, 205, 206, 207, and 208 on which physical inventory is stored. The logical grid coordinate system 200 is generated by logically partitioning the physical warehouse environment into a plurality of grid locations. For example, the exemplary logical grid coordinate system 200 (or "logical floor plan") comprises X and Y coordinates, wherein the X coordinates are represented by the letters A, B, C, D, E, F, G, and H, and the Y coordinates are represented by numbers 1 through 10. In this instance, each aisle A, B, C, D, E, F, G, and H has nine (9) defined grid locations 1 through 9, while a common access aisle is defined by grid locations A10, B10, C10, D10, E10, F10, G10, and H10 at the beginning of respective aisles A, B, C, D, E, F, G, and H. In an exemplary embodiment, the coordinates of physical inventory items on the shelves within the aisles include X and Y coordinates of the exemplary logical grid coordinate system 200, as well as Z coordinates which represent the vertical (height) coordinates of where inventory items are placed on the shelves at a given X-Y location.

For illustrative purposes, FIG. 2 schematically illustrates a plurality of mobile objects 210-1, 210-2, 210-3, 210-4, and 210-5 (e.g., AGVs) which, at a given point in time, are located at a given grid coordinate and have associated routes that are assigned to the mobile objects (wherein the assigned routes are illustrated by dashed arrows). More specifically, at the given point in time illustrated in FIG. 2, a first mobile object 210-1 is located at a grid coordinate B10 and has an assigned route R1 to a destination grid coordinate B6. Further, at the given point in time, a second mobile object 210-2 is located at a grid coordinate E5 and has an assigned route R2 to a destination grid coordinate E1. Moreover, at the given point in time, a third mobile object 210-3 is located at a grid coordinate F3 and has an assigned route R3 to a destination grid coordinate F10. In addition, at the given point in time, the mobile object 210-4 is located at a grid coordinate G7 and has an assigned route R4 to a destination grid coordinate D10. Furthermore, at the given point in time, it is assumed that the mobile object 210-5 is statically located at grid coordinate H6. For example, the mobile object 210-5 may have reached its destination and is in the process of placing/retrieving physical inventory onto/from the shelves 208, or has completed a task and is waiting for a new assignment, or is temporarily disabled, etc.

The predictive spatial routing system 136 has knowledge of (i) the layout of the physical environment (e.g., warehouse floor plan) which is represented by the exemplary logical grid coordinate system 200 and (ii) the physical grid locations of all mobile objects that are available or in-use at any given time, and (iii) the speed at which the mobile objects can travel, etc., and utilizes such knowledge to compute routes and orchestrate the movement of the mobile objects throughout the warehouse environment to facilitate inventory flow throughout the facility and prevent collisions of mobile objects. The predictive spatial routing system 136 assigns and reserves a route to a given mobile object for only a specific time window or interval, and not for the entire route for the entire time. Instead, once a given mobile object has been assigned a route to access/move physical inventory, the route is reserved with each coordinate for only for the duration that the given mobile object will be traversing through each coordinate. Because the route, location, and speed of the given mobile object are known, the duration of the given mobile object at each grid coordinate can be calculated. In this regard, since the logical grid coordinates that are reserved for routes have associated time dimensions, the routes can be calculated simultaneously for multiple objects to traverse the floor. Once the mobile object has cleared a given grid coordinate, the grid coordinate is marked available for future object route inclusion.

For example, as shown in FIG. 2, the grid locations represented by shaded boxes represent the coordinates that are currently reserved, at a given point in time, for the routes R1, R2, R3, and R4 that are assigned to the respective mobile objects 210-1, 210-2, 210-3, and 210-4. The assigned routes R1, R2, R3, and R4 ensure that there will be no collisions of the mobile objects along the assigned routes, at least as determined at the given time. For example, although the grid coordinate F10 is included in both routes R3 and R4 at the given time, the predictive spatial routing system 136 knows, based on the locations and speeds of the third and fourth mobile objects 210-3 and 210-4, that there will be no collision between the third and fourth mobile objects 210-3 and 210-4 at the grid coordinate F10, because it is anticipated that the fourth mobile object 210-4 will already have passed through the grid coordinate F10 by the time the mobile object 210-3 reaches the grid coordinate F10.

In this regard, since the logic grid coordinates (which are reserved for routes) have associated time dimensions, multiple routes can be computed concurrently to enable multiple mobile objects to traverse throughout the warehouse facility. The predictive spatial routing system 136 knows the route and speed of each mobile object and how long each mobile object will be at the grid coordinates of the routes, i.e., the predictive spatial routing system 136 knows precisely where each mobile object is and will be, and where each mobile object will not be at any given time. The predictive spatial routing system 136 reserves grid coordinates for a given route, and knows when specific coordinates are utilized, and when they are free, which allows other mobile objects to travel over the same grid coordinate at times when such grid coordinates are known to be free.

When a given route is computed and assigned to a given mobile object at a current time, a new route for the given mobile object can be recomputed at some future time before the mobile object reaches the destination location, as needed, depending on the real-time location information associated with mobile objects. For example, in the exemplary embodiment shown in FIG. 2, assume that the fourth mobile object 210-4 reaches the grid coordinate F10 and breaks down. Based on real-time location tracking information provided to the predictive spatial routing system 136 by the mobile object control system 132, the predictive spatial routing system 136 will determine that the fourth mobile object 210-4 is essentially stuck at the grid coordinate F10 and, in response, will re-compute a new route for the third mobile object 210-3 which eliminates the grid coordinate F10 to avoid a collision at F10.

Figure 3:
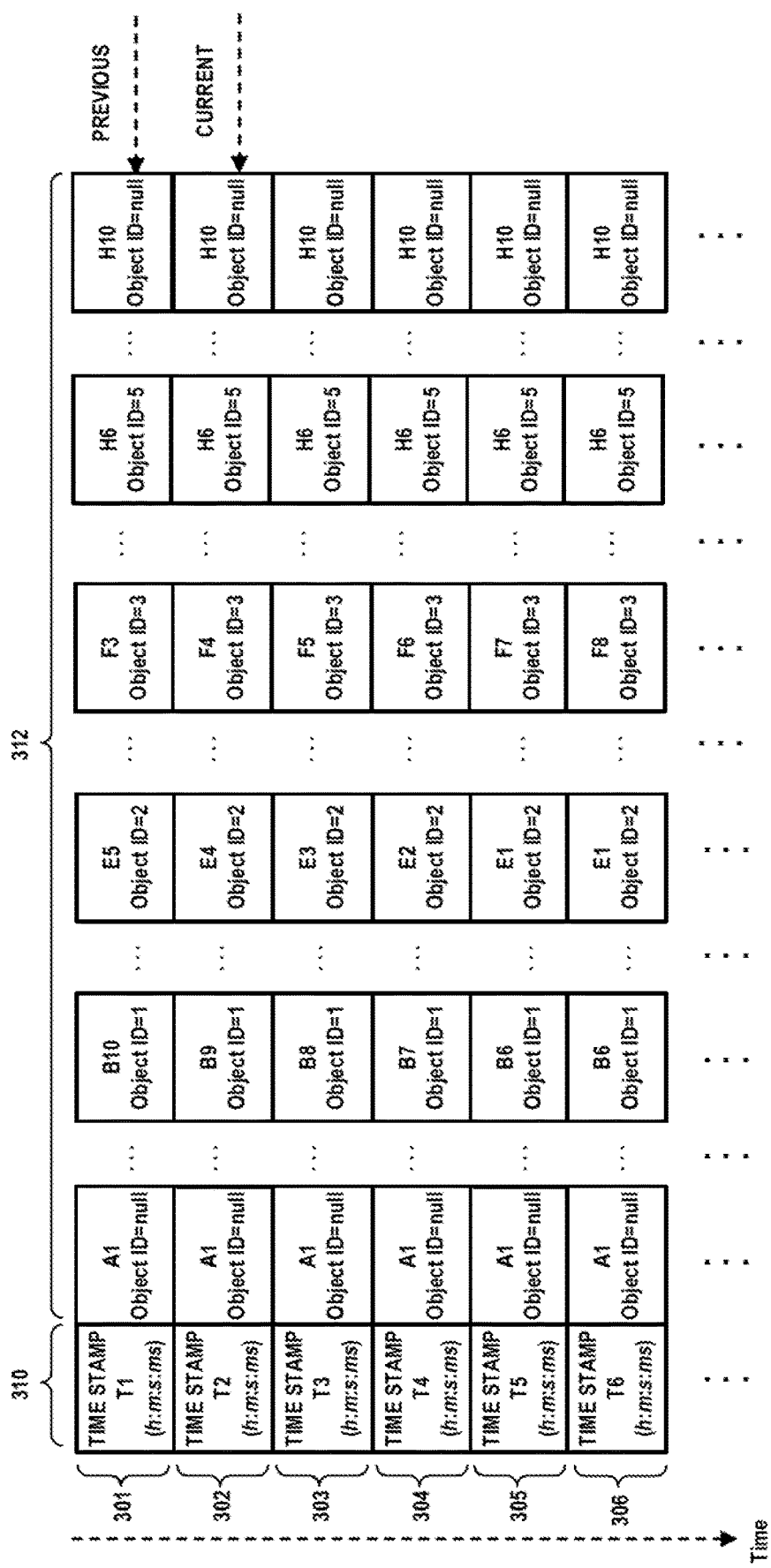
FIG. 3 schematically illustrates a data structure that is utilized for predictive spatial routing of objects, according to an exemplary embodiment of the disclosure.

As noted above, the predictive spatial routing system 136 maintains the database of spatial-aware routing information 138 to record and organize various types of information that is utilized by the predictive spatial routing system 136 to compute and reserve routes for the mobile objects. In some embodiments, the database of spatial-aware routing information 138 comprises a table data structure to organize such information, such as shown in FIG. 3. In particular, FIG. 3 schematically illustrates an exemplary data structure 300 that is generated and utilized by the predictive spatial routing system 136 to perform functions for predictive spatial routing of objects (e.g., mobile objects), according to an exemplary embodiment of the disclosure. For illustrative purposes, the exemplary data structure 300 of FIG. 3 will be discussed in the context of the exemplary logical grid coordinate system 200 of FIG. 2.

The exemplary data structure 300 comprises a table data structure which includes a plurality of records (rows) 301, 302, 303, 304, 305, 306, etc., and fields (columns) 310 and 312. Each record (row) 301, 302, 303, 304, 305, 306, etc., in the data structure 300 comprises a plurality of fields (columns) including a timestamp field 310 and a plurality of grid location fields 312. More specifically, each timestamp field 310 comprises a timestamp that is associated with the given record, wherein in some embodiments, the timestamp is recorded in hours:minutes:seconds:milliseconds (h:m:s: ms). The plurality of grid location fields 312 include a corresponding grid location field for each logical grid location in a given environment. For example, in the context of the exemplary logical grid coordinate system 200 of FIG. 2, the grid location fields 312 in each record (row) include a corresponding grid location field for each logical grid location A1, . . . , A10, B1, . . . , B10, C1, . . . , C10, D1, . . . , D10, E1, . . . , E10, F1, . . . , F10, G1, . . . , G10, and H1, . . . , H10. In some embodiments, each of the grid location fields 312 for a given record (row) 301, 302, 303, 304, 305, 306, etc., includes an entry that either set to "null" or set to an object identifier (ID), depending on whether a given mobile object is, or is expected to be, located at a given logical grid location associated with the given grid location field at a given time associated with the given record.

For illustrative purposes, FIG. 3 shows a plurality of table entries which correspond to the computed routes and associated reserved locations of the mobile objects 210-1, 210-2, 210-3, 210-4, and 210-5, as shown in FIG. 2. In this illustrative embodiment, each record (row) 301, 302, 303, 304, 305, 306, etc., of the data structure 300 comprises 81 fields including a single timestamp field 310 and eighty (80) grid location fields 312. Each record (row) 301, 302, 303, 304, 305, 306, etc., represents an actual or anticipated status of all logical grid coordinates of the exemplary logical grid coordinate system 200 at a given point in time represented by a respective timestamp value T1, T2, T3, T4, T5, T6, etc., based on the reserved grid coordinates for the computed routes.

In some embodiments, the timestamp values T1, T2, T3, T4, T5, T6, etc., chronologically increase with time, wherein the timestamp values T1, T2, T3, T4, T5, T6, etc., of the respective records (rows) 301, 302, 303, 304, 305, 306, etc., have time values that are recorded at a specified time period interval (e.g., every 0.5 seconds, 1.0 seconds, 2 second, 5 seconds, 10 seconds, etc.). In some embodiments, the time interval between the timestamp values T1, T2, T3, T4, T5, T6, etc., is a user-defined value that is based at least in part on the speed of the mobile objects and the time it takes for a mobile object to traverse each logical grid location, as will be explained in further detail below.

In the exemplary embodiment of FIG. 3, it is assumed that the mobile objects 210-1, 210-2, 210-3, 210-4, and 210-5 in FIG. 2 are assigned respective unique identifiers Object ID=1, Object ID=2, Object ID=3, Object ID=4, and Object ID=5. FIG. 3 illustrates the computed route (e.g., route R1) for the first mobile object 210-1 with the grid location fields 312 B10, B9, B8, B7, B6, and B6 of the respective records (rows) 301, 302, 303, 304, 305, and 306 each set to a value of Object ID=1, wherein at T5 it assumed that the first mobile object 210-1 will reach a destination grid location B6 and will be at the same location at time T6 (e.g., retrieving/placing inventory on a shelf at that grid location). Further, FIG. 3 illustrates the computed route (e.g., route R2) for the second mobile object 210-2 with the grid location fields 312 E5, E4, E3, E2, and E1 for the respective records (rows) 301, 302, 303, 304, 305, and 306 each having a value of Object ID=2, wherein at T5 it assumed that the second mobile object 210-2 will reach a destination grid location E1 and will be at the same location at time T6 (e.g., retrieving/placing inventory on a shelf at that grid location). Moreover, FIG. 3 illustrates the computed route (e.g., route R3) for the third mobile object 210-3 with the grid location fields 312 F3, F4, F5, F6, F7, and F8 for the respective records (rows) 301, 302, 303, 304, 305, and 306 each having a value of Object ID=3. In addition, FIG. 3 illustrates that the fifth mobile object 210-5 is expected to remain stationary at the grid location H6 at each of the times T1, T2, T3, T4, T5, and T6, since the grid location field 312 H6 for each record (row) 301, 302, 303, 304, 305, and 306 is set to a value of Object ID=5.

In an illustrative embodiment, assume that the field entries of the records (rows) 301, 302, 303, 304, 305, 306, etc. in FIG. 3 were populated at the time of the timestamp value T1 to reserve the grid locations associated with the compute routes/locations of the mobile objects 210-1, 210-2, 210-3, 210-4, and 210-5. In this instance, at the time T1, the Object ID entries in the grid location fields 312 of the record (row) 301 represent the actual locations of the mobile objects 210-1, ..., 210-5, while the Object ID entries in the grid location fields 312 of the records 302, 303, 304, 305, 306, etc., represent the anticipated locations of the mobile objects 210-1, ..., 210-5 at the associated times T2, T3, T4, T5, T6, etc., based on the computed/updated routes of the mobile objects 210-1, ..., 210-5 at time T1.

As time progresses and a given record (row) becomes obsolete, the grid locations associated with the obsolete are marked available for future object route inclusion. For example, as shown in FIG. 3, at time T2 (current time), the Object ID entries in the grid location fields 312 of the record (row) 301 become obsolete, while the Object ID entries in the grid location fields 312 of the records (rows) 302, 303, 304, 305, 306, etc., remain valid and reserved. As shown in FIG. 3, for each time interval (represented by the timestamp field 310), a new instance (row) of a common table is generated, which allows for all mobile objects to reserve each floor coordinate. In this instance, each record (row) 301, 302, 303, 304, 305, 306, etc., shown in FIG. 3 can be viewed as a separate table data structure (e.g., a single row, multiple column table data structure), wherein a new table is generated at each time interval. In other words, each logical grid coordinate for a given route (for a given mobile object) is reserved across multiple table data structures, with each table representing a timed interval based on an anticipated presence of the given mobile object at a given logical grid coordinate at the given moment in time. This eliminates the risk of one master table from being corrupted and allows for previous tables (e.g., single rows) to be archived or purged.

As noted above, in some embodiments, the time interval between the timestamp values T1, T2, T3, T4, T5, T6, etc., is a user-defined value that is based at least in part on the speed of the mobile objects and the time it takes for the mobile objects to traverse each logical grid location. For example, in the illustrative embodiment of FIG. 3, when computing the routes of the mobile objects 210-1, ..., 210-5, it is assumed that the mobile objects 210-1, ..., 210-5 have a same maximum operating speed and can physically move from one logical grid location to a next logical grid location over one (1) user-specified time interval. By way of example, from time T1 to time T6, the route for the mobile object 210-3 is computed with the expectation that the mobile object 210-3 will sequentially traverse the grid locations from F3 to F8 over the time intervals from time T1 to time T6.

In other embodiments, when the mobile objects that are utilized in a given warehouse environment have different speeds, the user-specified time interval can be set to a time duration that provides sufficient time granularity to properly track the mobile objects. By way of example, the user-specified time interval can be set to e.g., 0.5 seconds or 1 second to properly track and compute routes for a plurality of mobile objects which have different speeds, where it takes some mobile objects 1.5 seconds to move between grid locations, and it takes other mobile objects 2.0 and 2.5 seconds to move between grid locations, etc.

In some embodiments, the user-specified time interval for computing routes and reserving grid locations for mobile objects corresponds to the same time interval by which the predictive spatial routing system 136 tracks the current locations of the mobile objects. As noted above, the mobile object control system 132 communicates (via an API) with the mobile objects to, e.g., track the real-time grid coordinate locations of the mobile objects (whether in motion or static), and then provides real-time grid coordinate location updates of the mobile objects to the predictive spatial routing system 136. The predictive spatial routing system 136 utilizes the real-time grid coordinate location updates of the mobile objects to determine if the actual grid locations of the mobile objects at a given time corresponds to the expected grid location of the mobile objects at the given time based on the computed routes and associated reserved grid locations in the database of spatial-aware routing information 138. At any given time, if the current location of a given mobile object does not correspond to the expected location of the given mobile object, the predictive spatial routing system 136 will re-compute the routes for one or more of the mobile objects at the given time, as needed, to ensure that there is no potential for collision between two mobile objects as a result of the two mobile objects traversing to the same grid location at the same time. In all instances, since the predictive spatial routing system 136 has knowledge of the logical grid coordinates of the given warehouse environment, as well as the computed routes, locations, the expected dwell times of the mobile objects at each reserved grid coordinate, the speeds of the mobile objects, etc., the predictive spatial routing system 136 can intelligently compute routes for the mobile objects in a manner that enables a continuous movement of the mobile objects, and thus the inventory, in the given environment.

Figure 4:
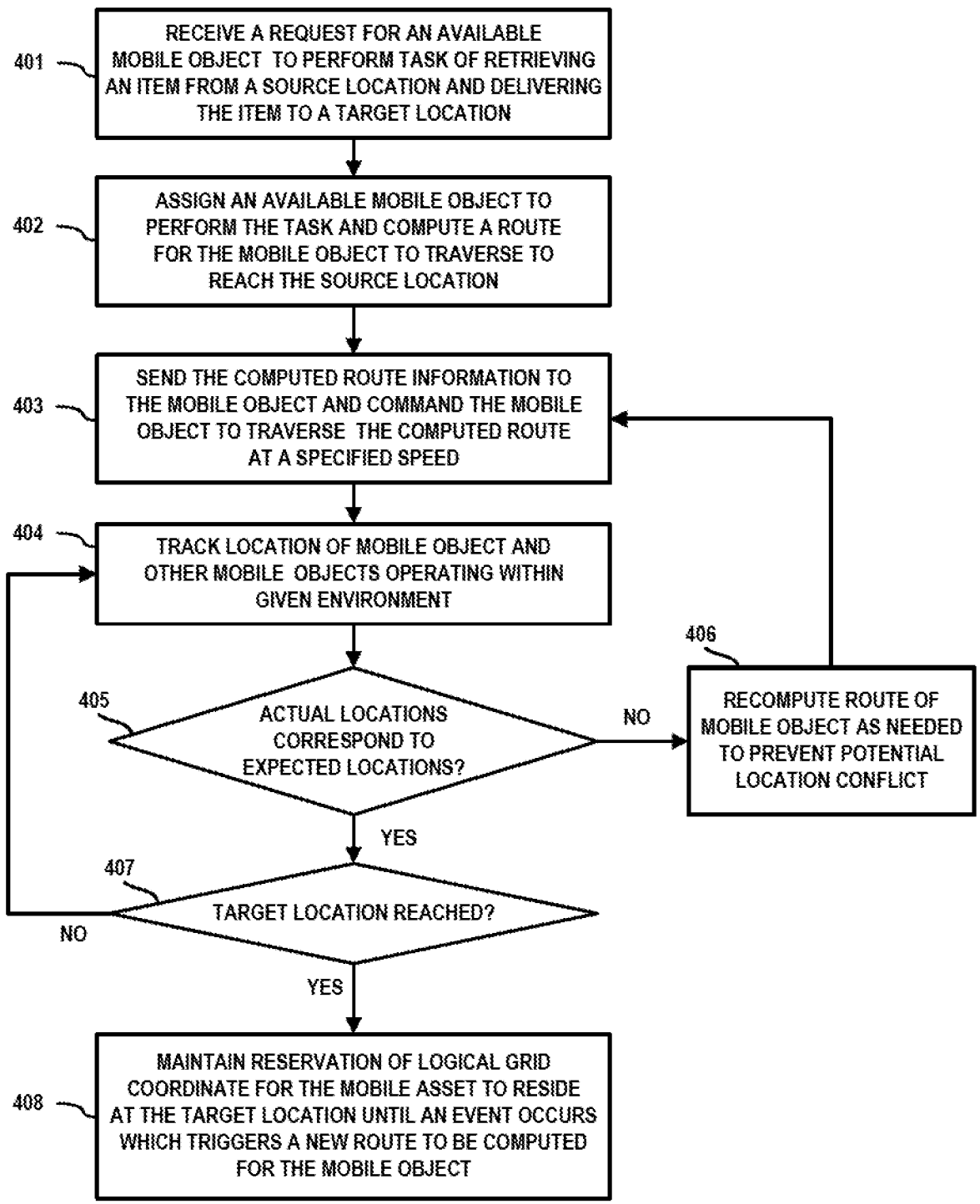
FIG. 4 illustrates a flow diagram of a method for predictive spatial routing of objects, according to an exemplary embodiment of the disclosure.

FIG. 4 illustrates a flow diagram of a method 400 for predictive spatial routing of objects, according to an exemplary embodiment of the disclosure. In some embodiments, FIG. 4 illustrates an exemplary mode of operation of the object routing management system 130 of FIG. 1. For purposes of illustration, the process flow of FIG. 4 will be discussed in the context of the system of FIG. 1 and the data structure 300 of FIG. 3, although it is to be understood that the method of FIG. 4 is not limited to the exemplary embodiments shown in FIGS. 1 and 3. In addition, for purposes of illustration, while the process flow of FIG. 4 will be discussed in the context of a given mobile object that is assigned to perform a given task, it is to be understood that the same process can be performed concurrently, or partly concurrently, for one or more other mobile objects.

As an initial step, the object routing management system 130 receives a request for an available mobile object (e.g., AGV) to perform a task of retrieving an item (e.g., physical inventory) from a source location and delivering the item to a target location (block 401). For example, in some embodiments, as noted above, the inventory management system 134 receives a request from the logistics management system 152 to move inventory within a warehouse environment, and the inventory management system 134 communicates with the predictive spatial routing system 136 to determine and assign a mobile object which is available to perform the requested task.

The object routing management system 130 assigns a given mobile object (e.g., AGV) which is currently available to perform the task and then computes a route for the given mobile object to traverse to reach the source location (block 402). For example, in some embodiments, as noted above, the predictive spatial routing system 136 accesses the database of spatial-aware routing information 138 to (i) determine an available mobile object which is closest to the source location of the item to be accessed and moved, and (ii) compute a route for the mobile object to traverse to reach the source location and access the item. The database of spatial-aware routing information 138 comprises a data structure (e.g., data structure 300, FIG. 3) which includes information regarding the current and future grid locations that are reserved for all mobile objects within the warehouse environment at current and future times, wherein such information allows the predictive spatial routing system 136 to determine and reserve available grid locations that define a route to the source location. The computed route for the mobile object is reserved with each grid coordinate for only for the time duration that the mobile object will be traversing through each grid coordinate. Since the route and speed of the mobile object is known, the duration at each grid coordinate can be calculated. In addition, since logical grid locations have an associated time dimension, the route for the mobile object can be computed concurrently with other new or previously computed routes of other mobile objects, while ensuring that two or more mobile objects will traverse to the same physical grid location at the same time.

Once the given mobile object is assigned and a route is computed, the object routing management system 130 will send the computed route information to the given mobile object with a command for the mobile object to traverse the computed route at a specified speed (block 403). For example, in some embodiments, as noted above, the predictive spatial routing system 136 sends the route information to the mobile object control system 132, and the mobile object control system 132 transmits the route information and a speed control command to the given mobile object assigned to perform the task.

The object routing management system 130 tracks the location of the given mobile object and other mobile objects operating within the given warehouse environment (block 404) and utilizes the location information to determine whether the actual locations of the mobile objects correspond to the expected locations of the mobile objects based on the reserved grid locations for the compute routes at a given time (block 405). This allows the object routing management system 130 to determine if a potential location conflict exists based on the currently computed routes and/or static locations of the mobile objects within the given environment, which may result from, e.g., one or more mobile objects not operating at the commanded speed, temporarily stopping before reaching a target location, breaking down, etc.

For example, in some embodiments, the object routing management system 130 continuously tracks the location of all mobile objects operating within the given environment and periodically transmits the current location information of the mobile objects to the predictive spatial routing system 136. The predictive spatial routing system 136 utilizes the current location information of the mobile objects to determine if the actual locations of the mobile objects correspond to the expected locations of the mobile object at the given time based on the computed route information in the database of spatial-aware routing information 138. By way of example, in the exemplary data structure 300 of FIG. 3, assuming the current time is T2, if the mobile objects with, e.g., Object ID=1, Object ID=2, Object ID=3, are actually located at the expected reserved logical grid locations B9, E4 and F4, respectively, then the currently computed routes are maintained. On the other hand, if any one of the mobile objects with, e.g., Object ID=1, Object ID=2, Object ID=3, are not actually located at the expected reserved logical grid locations B9, E4 and F4, respectively, for the currently computed routes, the predictive spatial routing system 136 will proceed to recompute one or more routes, as needed, to prevent potential location conflict between two or more mobile objects.

Referring back to FIG. 4, if the object routing management system 130 determines, at a given time, that the actual locations of one or more of the mobile objects do not correspond to the expected locations of the one or more mobile objects based on the reserved grid locations for the computed routes at the given time (negative determination in block 405), the object routing management system 130 will recompute a new route for, e.g., the given mobile object, as needed, to prevent a potential location conflict (block 406), and then send the new route information and speed command the given mobile object (block 403).

Once the given mobile object has reached is target location (affirmative determination in block 407), the object routing management system 130 will maintain the reservation of the logical grid coordinate for the given mobile object to reside at the target location until some event occurs which triggers a new route to be computed for the given mobile object (block 408). For example, in the exemplary data structure 300 of FIG. 3, the mobile object 210-5 with the Object ID=5 has a reserved static location at logical grid coordinate H6 for the times T1-T6. In this instance, the given mobile object may have reached the source location to retrieve an item of inventory from a shelf, where it is expected that it will take some time (e.g., a multiple of the user-specified time interval for computing routes) for the given mobile object to retrieve the item of inventory from the shelf before traversing to a destination location to move the inventory item. Once the given mobile object has retrieved the item of inventory, the mobile object will send a notification to the mobile object control system 132 that it is ready to transport the inventory item from a source location to the destination location. In response, the predictive spatial routing system 136 will compute a route for the given mobile object to traverse from the source location to the destination location using the techniques as discussed above.

In another instance, the mobile object 210-5 may have reached a destination at the logical grid location H6 at time T1 and is placing an item of inventory on a given shelf at the destination grid location H6 during at least the period from T1 to T6. As such, the object routing management system 130 will maintain the reservation of the logical grid coordinate H6 for the given mobile object to reside at the destination location at least until the mobile object 210-5 sends notification to the object routing management system 130 that the task is complete and is ready for a new assignment. In this instance, the mobile object 210-5 can statically reside at the grid location H6 until it receives a new task assignment. In particular, in some embodiments, once a mobile object (e.g., AGV) has reached its final delivery destination at a given logical grid location, the logical grid location will be maintained/reserved for the mobile object (e.g., in the data structure 300 of FIG. 3) until a new task is triggered.

It is to be appreciated that the exemplary techniques as discussed herein allow for intelligent routing of mobile objects (e.g., AGVs) within a given environment (e.g., warehouse environment) to effectively orchestrate the movement of the mobile objects throughout the warehouse environment in a manner that reduces idle time and improve inventory flow throughout the facility. This is in contrast to conventional inventory management systems which assign static routes to mobile objects to move inventory items, and do not implement intelligence for tracking the routes and location of all mobile objects as a function of time to orchestrate the movement of the mobile objects. Instead, conventional inventory management systems simply instruct a given mobile object to retrieve a given item from one location and move the given item to another location, while relying on the mobile objects themselves to avoid collisions with other mobile objects while traversing the statically allocated routes. With the exemplary intelligent mobile object routing systems and methods as discussed herein, the floor space of a given environment is segmented into logical grid locations, and the routes are dynamically computed and allocated in increments of grid locations and time intervals (rather than statically allocated as a whole), to intelligently implement a route orchestration method which enables continuous motion of mobile objects in route, while preventing the need for the mobile objects (e.g., AGVs and mobile racks) to detect other mobile objects and continuously stop and go to avoid collisions.

It is to be understood that the exemplary mobile object routing techniques are discussed herein in the context of inventory logistics for purposes of illustration. However, such exemplary techniques for intelligent route calculation based on space and time reservation of logical grid coordinates to facilitate continuous motion of mobile objects, can be readily applied to other edge computing environments as well, e.g., robots in a factory, train control systems for trains in motion across a rail system or a rail yard, traffic control system for vehicular traffic orchestration in a city infrastructure, and other multi-object-in-motion environments.

Figure 5:
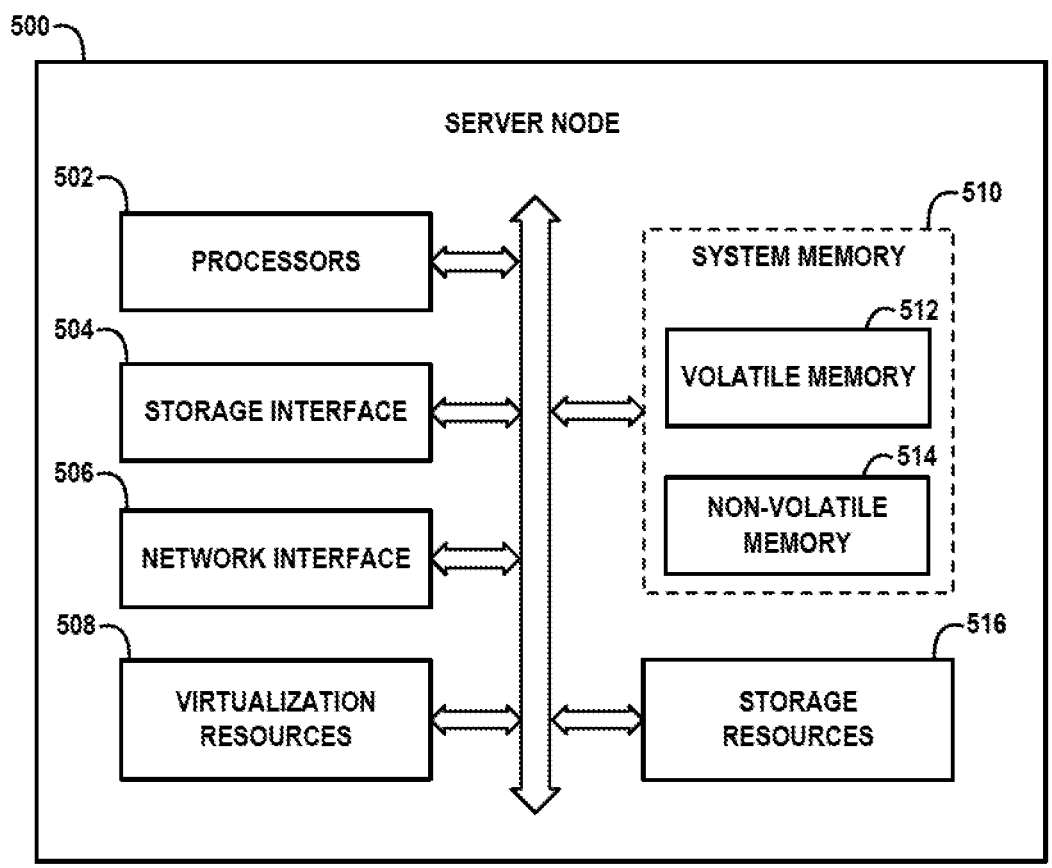
FIG. 5 schematically illustrates a framework of a server node for hosting software components of an object routing management system, according to an exemplary embodiment of the disclosure.

FIG. 5 schematically illustrates a framework of a compute node for hosting software components of an object routing management system, according to an exemplary embodiment of the disclosure. The server node 500 comprises processors 502, storage interface circuitry 504, network interface circuitry 506, virtualization resources 508, system memory 510, and storage resources 516. The system memory 510 comprises volatile memory 512 and non-volatile memory 514. The processors 502 comprise one or more types of hardware processors that are configured to process program instructions and data to execute a native operating system (OS) and applications that run on the server node 500.

For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 506 enables the server node 500 to interface and communicate with a network and other system components. The network interface circuitry 506 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more services or functions which are hosted by the server node 500. For example, the virtualization resources 508 can be configured to implement the various modules and functionalities as discussed herein. In some embodiment, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 as well execute one or more of the various modules and functionalities of a storage system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent software components and associated functions of an object routing management system as described, are implemented using program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Computer program products which comprise a non-transitory processor-readable storage medium having stored therein program code of one or more software programs are considered embodiments of the disclosure. A processor-readable storage medium may comprise, for example, a storage device such as a storage disk, a storage array or an integrated circuit containing memory. The term "processor-readable storage medium" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of NAND Flash storage devices, SSD devices, or other types of next generation non-volatile memory (NGNVM) devices. The system memory 510 can be implemented using a hierarchical memory tier structure wherein the volatile memory 512 is configured as the highest-level memory tier, and the non-volatile memory 514 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the server node 500, and to temporarily store data that is utilized and/or generated by the native OS and application programs and processes running on the server node 500. The storage resources 516 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
receiving, by an object routing system, a request for a given mobile object to traverse from a first location to a second location in a physical environment which is logically partitioned into a plurality of grid locations;
computing, by the object routing system, a route for the given mobile object to traverse from the first location to the second location, the computed route comprising a sequence of grid locations which are reserved at corresponding times over a time period comprising a plurality of prespecified time intervals, wherein each grid location of the computed route is reserved for one or more corresponding prespecified time intervals of the plurality of prespecified time intervals, for which the given mobile object is expected to traverse through that grid location;
commanding, by the object routing system, the given mobile object to traverse the computed route;
determining, by the object routing system, whether a current location of the given mobile object at a given time corresponds to an expected grid location of the given mobile object at the given time; and
computing, by the object routing system, a new route for the given mobile object from the current location to the second location, in response to determining that the current location of the given mobile object at the given time does not correspond to the expected grid location of the given mobile object at the given time;
wherein computing the new route comprises determining a new sequence of grid locations, from the current location to the second location, which are reserved at corresponding times over a new time period comprising one or more of the prespecified time intervals.

2. The method of claim 1, wherein the prespecified time intervals comprise time intervals having a same prespecified duration, which is utilized to reserve grid locations of computed routes of a plurality of mobile objects operating in the physical environment.

3. The method of claim 2, wherein the time period comprising the plurality of prespecified time intervals is determined based at least in part on at least one of a speed of the given mobile object and a time duration for the given mobile object to traverse each grid location of the computed route.

4. The method of claim 1, wherein computing the route for the given mobile object, comprises:
accessing, by the object routing system, a database of routing information which comprises one or more computed routes for one or more additional mobile objects in the physical environment;
determining, by the object routing system, a plurality of grid locations which are available to reserve at corresponding times to compute the route for the given mobile object, and which do not conflict with reserved grid locations and corresponding times associated with the one or more computed routes for the one or more additional mobile objects; and
updating, by object routing system, the database of routing information to include the computed route for the given mobile object.

5. The method of claim 4, wherein:
the database of routing information comprises a table data structure which comprise at least one record, wherein the at least one record comprises a timestamp field and a plurality of grid location fields;
the timestamp field is configured to record a time associated with the record; and
the plurality of grid location fields comprises a corresponding grid location field for each grid location of the physical environment, wherein each grid location field is configured to record an object identifier associated with a mobile object that is either located or expected to be located in the grid location corresponding to the grid location field at the time recorded in the timestamp field.

6. The method of claim 5, wherein the computed route for the given mobile object is specified over sequence of records in the table data structure.

7. The method of claim 1, wherein determining whether a current location of the given mobile object at a given time corresponds to an expected grid location of the given mobile object at the given time, comprises tracking, by the object routing system, a physical location of the given mobile object at each prespecified time interval as the given mobile object traverses the computed route.

8. The method of claim 1, further comprising:
tracking, by the object routing system, a physical location of at least one other mobile object as the at least one other mobile object traverses another computed route;
determining, by the object routing system, whether the physical location of the at least one other mobile object at a given time corresponds to an expected grid location of the at least one other mobile object at the given time; and
computing, by the object routing system, a new route for the given mobile object, in response to determining that the physical location of the at least one other mobile object at the given time does not correspond to the expected grid location of the at least one other mobile object at the given time, to thereby avoid a potential collision between the given mobile object and the at least one other mobile object.

9. The method of claim 1, wherein the object routing system comprises a logistics management system which is configured to manage routing of automated guided vehicles that move inventory items in warehouse environment.

10. A computer program product comprising a non-transitory processor-readable storage medium having stored therein program code of one or more software programs, wherein the program code when executed by at least one processing device causes the at least one processing device to:
receive a request for a given mobile object to traverse from a first location to a second location in a physical environment which is logically partitioned into a plurality of grid locations;
compute a route for the given mobile object to traverse from the first location to the second location, the computed route comprising a sequence of grid locations which are reserved at corresponding times over a time period comprising a plurality of prespecified time intervals, wherein each grid location of the computed route is reserved for one or more corresponding prespecified time intervals of the plurality of prespecified time intervals, for which the given mobile object is expected to traverse through that grid location;
command the given mobile object to traverse the computed route;
determine whether a current location of the given mobile object at a given time corresponds to an expected grid location of the given mobile object at the given time; and
compute a new route for the given mobile object from the current location to the second location, in response to determining that the current location of the given mobile object at the given time does not correspond to the expected grid location of the given mobile object at the given time;
wherein computing the new route comprises determining a new sequence of grid locations, from the current location to the second location, which are reserved at corresponding times over a new time period comprising one or more of the prespecified time intervals.

11. The computer program product of claim 10, wherein:
the prespecified time intervals comprise time intervals having a same prespecified duration, which is utilized to reserve grid locations of computed routes of a plurality of mobile objects operating in the physical environment; and
the time period comprising the plurality of prespecified time intervals is determined based at least in part on at least one of a speed of the given mobile object and a time duration for the given mobile object to traverse each grid location of the computed route.

12. The computer program product of claim 10, wherein the program code to compute the route for the given mobile object, comprises program code to:
access a database of routing information which comprises one or more computed routes for one or more additional mobile objects in the physical environment;
determine a plurality of grid locations which are available to reserve at corresponding times to compute the route for the given mobile object, and which do not conflict with reserved grid locations and corresponding times associated with the one or more computed routes for the one or more additional mobile objects; and
update the database of routing information to include the computed route for the given mobile object.

13. The computer program product of claim 12, wherein:
the database of routing information comprises a table data structure which comprise at least one record, wherein the at least one record comprises a timestamp field and a plurality of grid location fields;
the timestamp field is configured to record a time associated with the record; and
the plurality of grid location fields comprises a corresponding grid location field for each grid location of the physical environment, wherein each grid location field is configured to record an object identifier associated with a mobile object that is either located or expected to be located in the grid location corresponding to the grid location field at the time recorded in the timestamp field.

14. The computer program product of claim 10, wherein the program code to determine whether a current location of the given mobile object at a given time corresponds to an expected grid location of the given mobile object at the given time, comprises program code which when executed by at least one processing device causes the at least one processing device to track a physical location of the given mobile object at each prespecified time interval as the given mobile object traverses the computed route.

15. A system, comprising:
a plurality of mobile objects; and
one of more server nodes that host an object routing system, wherein the object routing system is configured to:
receive a request for a given mobile object to traverse from a first location to a second location in a physical environment which is logically partitioned into a plurality of grid locations;
compute a route for the given mobile object to traverse from the first location to the second location, the computed route comprising a sequence of grid locations which are reserved at corresponding times over a time period comprising a plurality of prespecified time intervals, wherein each grid location of the computed route is reserved for one or more corresponding prespecified time intervals of the plurality of prespecified time intervals, for which the given mobile object is expected to traverse through that grid location; command the given mobile object to traverse the computed route;

determine whether a current location of the given mobile object at a given time corresponds to an expected grid location of the given mobile object at the given time; and compute a new route for the given mobile object from the current location to the second location, in response to determining that the current location of the given mobile object at the given time does not correspond to the expected grid location of the given mobile object at the given time;

wherein computing the new route comprises determining a new sequence of grid locations, from the current location to the second location, which are reserved at corresponding times over a new time period comprising one or more of the prespecified time intervals.

16. The system of claim 15, wherein:
the prespecified time intervals comprise time intervals having a same prespecified duration, which is utilized to reserve grid locations of computed routes of a plurality of mobile objects operating in the physical environment; and
the time period comprising the plurality of prespecified time intervals is determined based at least in part on at least one of a speed of the given mobile object and a time duration for the given mobile object to traverse each grid location of the computed route.

17. The system of claim 15, wherein in computing the route for the given mobile object, the object routing system is configured to:

access a database of routing information which comprises one or more computed routes for one or more additional mobile objects in the physical environment;
determine a plurality of grid locations which are available to reserve at corresponding times to compute the route for the given mobile object, and which do not conflict with reserved grid locations and corresponding times associated with the one or more computed routes for the one or more additional mobile objects; and
update the database of routing information to include the computed route for the given mobile object.

18. The system of claim 17, wherein:
the database of routing information comprises a table data structure which comprise at least one record, wherein the at least one record comprises a timestamp field and a plurality of grid location fields;
the timestamp field is configured to record a time associated with the record; and
the plurality of grid location fields comprises a corresponding grid location field for each grid location of the physical environment, wherein each grid location field is configured to record an object identifier associated with a mobile object that is either located or expected to be located in the grid location corresponding to the grid location field at the time recorded in the timestamp field.

19. The system of claim 15, wherein in determining whether a current location of the given mobile object at a given time corresponds to an expected grid location of the given mobile object at the given time, the object routing system is further configured to track a physical location of the given mobile object at each prespecified time interval as the given mobile object traverses the computed route.

20. The system of claim 15, wherein the object routing system comprises a logistics management system which is configured to manage routing of automated guided vehicles that move inventory items in warehouse environment.

* * * * *